United States Patent
Wiktor et al.

(10) Patent No.: US 9,926,005 B2
(45) Date of Patent: Mar. 27, 2018

(54) PRESSURIZED MEDIUM ASSEMBLY

(71) Applicant: VOLVO CONSTRUCTION EQUIPMENT AB, Eskilstuna (SE)

(72) Inventors: Roland Wiktor, Hameln (DE); Kim Heybroek, Kvicksund (SE)

(73) Assignee: Volvo Construction Equipment AB, Eskilstuna (SE)

( * ) Notice: Subject to any disclaimer, the term of this patent is extended or adjusted under 35 U.S.C. 154(b) by 401 days.

(21) Appl. No.: 14/443,389

(22) PCT Filed: Nov. 20, 2012

(86) PCT No.: PCT/SE2012/000192
§ 371 (c)(1),
(2) Date: May 17, 2015

(87) PCT Pub. No.: WO2014/081353
PCT Pub. Date: May 30, 2014

(65) Prior Publication Data
US 2015/0298730 A1   Oct. 22, 2015

(51) Int. Cl.
*F15B 11/00* (2006.01)
*B62D 5/20* (2006.01)
(Continued)

(52) U.S. Cl.
CPC ............... *B62D 5/20* (2013.01); *B62D 12/00* (2013.01); *E02F 3/431* (2013.01); *E02F 9/0841* (2013.01);
(Continued)

(58) Field of Classification Search
CPC ......... F15B 11/006; E02F 3/431; E02F 9/225; E02F 9/0841; B62D 12/00; B62D 5/20
(Continued)

(56) References Cited

U.S. PATENT DOCUMENTS 3,200,713 A * 8/1965 Gunther ................. B23Q 5/266
   82/133
5,193,637 A * 3/1993 Lindblom .............. B62D 12/00
   180/418
(Continued)

FOREIGN PATENT DOCUMENTS

CN   2648151 Y   10/2004
CN   1817611 A    8/2006
(Continued)

OTHER PUBLICATIONS

Supplementary European Search Report (dated May 20, 2016) for corresponding European App. EP 12 88 8962.
(Continued)

*Primary Examiner* — Thomas E Lazo
(74) *Attorney, Agent, or Firm* — WRB-IP LLP

(57) ABSTRACT

A pressurized medium assembly includes a first working chamber and a second working chamber. The first and second working chambers are adapted to together produce a load. The pressurized medium assembly includes a first control arrangement adapted to provide a fluid communication between the first working chamber and a pressure line in an on/off manner. The pressurized medium assembly further includes a second control arrangement adapted to provide a fluid communication between the second working chamber and a pressure line. The second control arrangement is adapted to proportionally regulate the pressure in the second working chamber.

14 Claims, 15 Drawing Sheets

(51) Int. Cl.
  *B62D 12/00* (2006.01)
  *E02F 9/08* (2006.01)
  *E02F 9/22* (2006.01)
  *F15B 15/14* (2006.01)
  *F15B 15/20* (2006.01)
  *E02F 3/43* (2006.01)
  *F15B 11/036* (2006.01)

(52) U.S. Cl.
  CPC ............ *E02F 9/225* (2013.01); *E02F 9/2221* (2013.01); *E02F 9/2228* (2013.01); *F15B 11/006* (2013.01); *F15B 15/1423* (2013.01); *F15B 15/20* (2013.01); *F15B 11/036* (2013.01); *F15B 2211/30575* (2013.01); *F15B 2211/3144* (2013.01); *F15B 2211/365* (2013.01); *F15B 2211/7055* (2013.01)

(58) Field of Classification Search
  USPC .......................................................... 60/420
  See application file for complete search history.

(56) References Cited

U.S. PATENT DOCUMENTS

| | | | | |
|---|---|---|---|---|
| 5,732,789 | A * | 3/1998 | Stephenson | B62D 5/09 180/418 |
| 6,655,136 | B2 * | 12/2003 | Holt | E02F 9/2207 60/414 |
| 6,763,661 | B2 * | 7/2004 | Tabor | E02F 3/405 60/327 |
| 7,168,245 | B2 * | 1/2007 | Thunes | B62D 5/30 60/403 |
| 7,174,711 | B2 * | 2/2007 | Nanjo | E02F 9/2225 60/484 |
| 7,204,185 | B2 * | 4/2007 | Ma | F15B 11/006 91/446 |
| 7,210,396 | B2 * | 5/2007 | Kuehn | E02F 9/2228 60/461 |
| 7,624,836 | B2 * | 12/2009 | Huang | B62D 6/002 180/421 |
| 8,657,083 | B2 * | 2/2014 | Vigholm | E02F 9/2207 188/266.1 |
| 2004/0050241 | A1 | 3/2004 | Sakaki | |
| 2006/0243128 | A1 | 11/2006 | Ma et al. | |
| 2007/0044650 | A1 | 3/2007 | Kuehn et al. | |
| 2008/0210505 | A1 | 9/2008 | Vigholm | |
| 2011/0192157 | A1 | 8/2011 | Ogawa | |

FOREIGN PATENT DOCUMENTS

| | | |
|---|---|---|
| CN | 1958234 A | 5/2007 |
| CN | 102144925 A | 8/2011 |
| CN | 102449321 A | 5/2012 |
| CN | 102803746 A | 11/2012 |
| EP | 1361312 A1 | 11/2003 |
| EP | 1584822 A2 | 10/2005 |
| FR | 2880143 A1 | 6/2006 |
| JP | S6060381 A | 4/1985 |
| WO | 2010040890 A1 | 4/2010 |
| WO | 2011091904 A2 | 8/2011 |

OTHER PUBLICATIONS

Chinese Official Action (dated Jan. 25, 2016) for corresponding Chinese App. 201280077191.0.
Chinese Official Action (Oct. 17, 2016) for corresponding Chinese App. 201280077191.0.
International Search Report (dated Aug. 19, 2013) for corresponding International App. PCT/SE2012/000192.
International Preliminary Report on Patentability (dated Feb. 18, 2015) for corresponding International App. PCT/SE2012/000192.

* cited by examiner

PRESSURIZED MEDIUM ASSEMBLY

BACKGROUND AND SUMMARY

The present disclosure relates to a pressurized medium assembly and to a method for controlling a pressurized medium assembly.

A pressurized medium assembly generally includes at least two working chambers each one of which being adapted to be pressurized in order to produce a load. The load produced may for instance be a resultant force and/or a resultant torque at a common point.

The magnitude of the load produced by the pressurized medium assembly is dependent on inter alia the pressure levels in the working chambers. To this end, the pressurized medium assembly generally includes control means, such as valve assemblies, adapted to control the pressure level in each one of the working chambers.

In order to reduce possible power losses in the pressure level control, WO 2010/040890 proposes that the pressure level in each one of the working chambers be controlled by shut-off valves, such as electrically and/or hydraulically controlled on/off valves. As such, WO 2010/040890 proposes a pressurized medium system in which each one of the working chambers can be pressurized to a finite number of pressure levels. The finite number of pressure levels in each one of the working chambers can be combined such that a finite number of load levels are produced by the pressurized medium system. A pressurized medium system such as the one presented in WO 2010/040890 may be referred to as a digital pressurized medium system.

Although a digital pressurized medium system may have the advantage of having relatively low power losses in the pressure level control portion thereof, the digital pressurized system may have the disadvantage that it is not always capable of producing a requested load. For instance, if a load is requested which is located between a lower one and a higher one, relative to the requested load, of the finite number of load levels that the digital pressurized system is capable of producing, there is a risk that the digital pressurized medium system will be oscillating between the lower and higher load level. Such an oscillation may impair the digital pressurized medium system as such and it may also have a negative effect on the member that is adapted to receive the load produced by the system.

It is desirable to provide a pressurized medium assembly that has reasonable power losses but wherein the risk of obtaining an oscillating load is reasonably low.

An aspect of the present disclosure relates to a pressurized medium assembly comprising a first working chamber and a second working chamber. The first and second working chambers are adapted to together produce a load. The pressurized medium assembly comprises a first control means being adapted to provide a fluid communication between the first working chamber and a pressure line in an on/off manner. The pressurized medium assembly further comprises a second control means adapted to provide a fluid communication between the second working chamber and a pressure line.

Moreover, the second control means is adapted to proportionally regulate the pressure in the second working chamber.

As used herein, the expression "load" is intended to encompass a resultant force and/or a resultant torque at a common point.

The pressurized medium assembly as presented hereinabove combines the possibility of obtaining reduced power losses, by virtue of the on/off control of the first working chamber, with the possibility to provide at least a load sub-range, by virtue of the proportional regulation of the pressure in the second working chamber, within which the load produced by the pressurized medium assembly can be infinitely varied. The infinite variation within the load range in turn implies that the risk of obtaining an oscillating load may be reduced.

Optionally, the effective area of the first working chamber is larger than the effective area of the second working chamber. In other words, the effective area of the second working chamber is smaller than the effective area of the first working chamber. This implies that possible power losses due to the proportional regulation of the pressure in the second working chamber may be reduced, as compared to a pressurized medium assembly in which the working chamber with the largest effective area is proportionally regulated.

As used herein, the expression "effective area" relates to the area of the working chamber upon which fluid pressure acts to provide a mechanical force.

Optionally, the second control means comprises a proportional pressure control valve. The use of a proportional pressure control valve may result in an improved accuracy of the proportional control of the pressure in the second working chamber.

Optionally, the pressurized medium assembly comprises, in addition to the first working chamber, at least one more working chamber adapted to be in fluid communication with a pressure line in an on/off manner. Optionally, the pressurized medium assembly comprises, in addition to the first working chamber, a plurality of additional working chambers each one of which being adapted to be in fluid communication with a pressure line in an on/off manner. To this end, the pressurized medium assembly may optionally comprise additional control means adapted to provide a fluid communication between the at least one more working chamber, or between each one of the plurality of additional working chambers, and a pressure line in an on/off manner. As such, a plurality of discrete load levels may be obtained with low power losses, since a plurality of working chambers are controlled in an on/off manner, and a proportional control of at least a subrange between at least two of the discrete load levels may be obtained by regulating the second working chamber.

Optionally, the pressurized medium assembly further comprises a third working chamber. The pressurized medium assembly further comprises a third control means adapted to provide a fluid communication between the third working chamber and a pressure line. The third control means is adapted to proportionally regulate the pressure in the third working chamber.

Optionally, the pressurized medium assembly comprises a single spool valve adapted to form a part of the second control means as well as the third control means. The fact that the assembly may comprise a single spool valve for regulating the pressure in the second working chamber as well as in the third working chamber implies that a relative compact and cost efficient control of both the chambers may be obtained.

A second aspect of the present disclosure relates to a pressurized medium steering system for an articulated vehicle, the pressurized medium steering system comprising a pressurized medium assembly according to the first aspect of the present disclosure.

A third aspect of the present disclosure relates to a vehicle comprising a pressurized medium assembly according to the first aspect of the present disclosure and/or a pressurized medium steering system according to the second aspect of the present disclosure.

A fourth aspect of the present disclosure relates to a method for controlling a pressurized medium assembly comprising a first working chamber and a second working chamber in order to produce a load, the method comprising:

controlling a fluid communication between the first working chamber and a pressure line in an on/off manner providing a fluid communication between the second working chamber and a pressure line, and proportionally regulate the pressure in the second working chamber.

Optionally, the pressurized medium assembly further comprises a third working chamber the method further comprising, providing a fluid communication between the third working chamber and a pressure line, and proportionally regulate the pressure in the third second working chamber.

Optionally, the second working chamber is an extending chamber and the third chamber is a retracting chamber, the method further comprising:

alternating between proportionally regulating the second chamber and proportionally regulating the third chamber.

The above discussed alteration may imply that a relatively smooth load control may be obtained.

BRIEF DESCRIPTION OF THE DRAWINGS

With reference to the appended drawings, below follows a more detailed description of embodiments of the invention cited as examples.

In the drawings.

It should be noted that the appended drawings are not necessarily drawn to scale and that the dimensions of some features of the present invention may have been exaggerated for the sake of clarity.

DETAILED DESCRIPTION OF PREFERRED EMBODIMENTS

Figure 1:
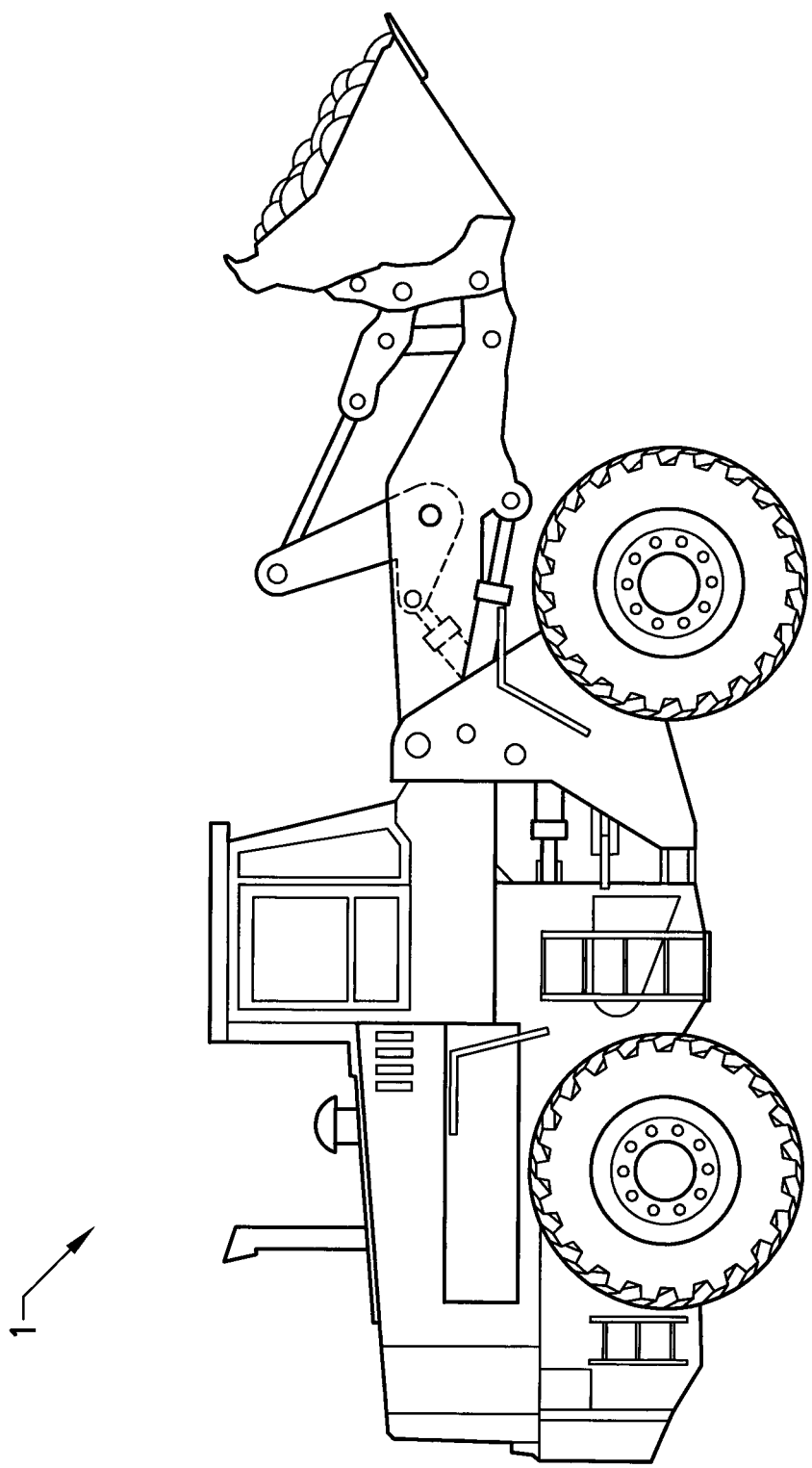
FIG. 1 illustrates a vehicle.

The invention will below be described for a vehicle in the form of a wheel loader 1 such as the one illustrated in FIG. 1. The wheel loader 1 should be seen as an example of a vehicle which could comprise a pressurized medium assembly according to the present invention. However, the pressurized medium assembly of the present invention may be implemented in a plurality of different types of vehicles. Purely by way of example, the pressurized medium assembly could be implemented in a truck, a lorry, a tractor, a car, a bus or any type of work machine.

Figure 2:
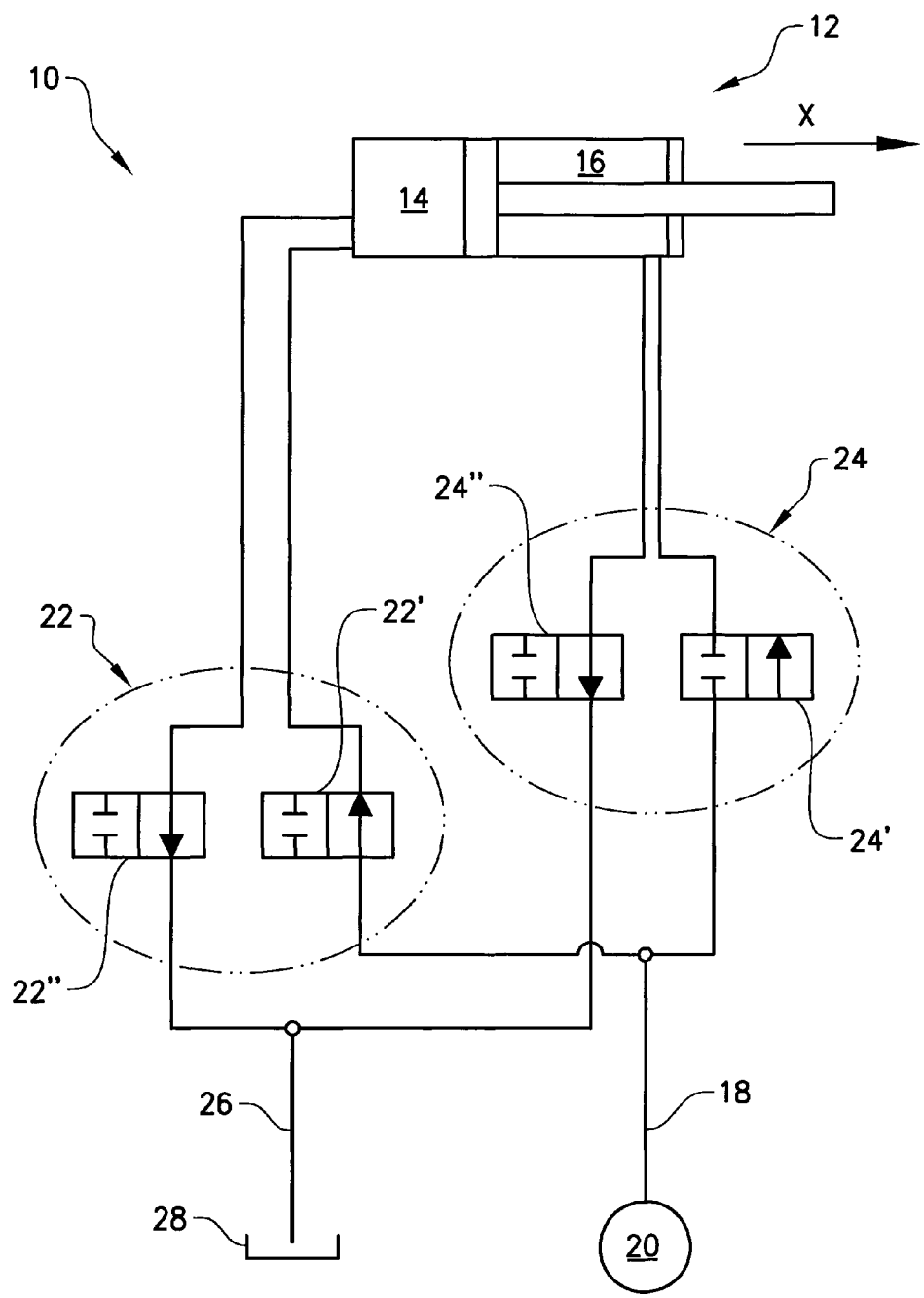
FIG. 2 illustrates a digital pressurized medium assembly.

FIG. 2 illustrates an example of a digital pressurized medium assembly 10. The FIG. 2 digital pressurized medium assembly 10 comprises an actuator 12 which in FIG. 2 is exemplified as a double acting cylinder with a first working chamber 14 and a second working chamber 16. The first working chamber 14 is an extracting working chamber and the second working chamber 16 is a retracting chamber. Moreover, the digital pressurized medium assembly 10 is adapted to produce a load in a first direction X.

Moreover, the digital pressurized medium assembly 10 illustrated in FIG. 2 comprises a first fluid line 18 which is in fluid communication with a pump 20 adapted to provide fluid at a predetermined non-zero positive pressure P. Moreover, the digital pressurized medium assembly 10 comprises a first control means 22, or first controller, adapted to provide a fluid communication between the first working chamber 14 and the first fluid line 18 in an on/off manner. To this end, the first control means 22 may comprise a first shut-off valve 22', such as an electrically and/or hydraulically controlled on/off valve, located between the first working chamber 14 and the first fluid line 18.

In a similar vein, the digital pressurized medium assembly 10 comprises a second control means 24, or second controller, adapted to provide a fluid communication between the second working chamber 16 and the first fluid line 18 in an on/off manner. To this end, the a second control means 24 may comprise a first shut-off valve 24', such as an electrically and/or hydraulically controlled on/off valve, located between the first second chamber 16 and the first fluid line 18.

FIG. 2 further illustrates that the digital pressurized medium assembly 10 comprises a second fluid line 26 which is in fluid communication with a tank 28. Each one of the first 22 and second 24 control means are adapted to provide on/off fluid communication between each one of the first and second chambers 14, 16 and the second fluid line 26. To this end, the first control means 22 may comprise a second shut-off valve 22", such as an electrically and/or hydraulically controlled on/off valve, located between the first working chamber 14 and the second fluid line 26. Moreover, the second control means 24 may comprise a second shut-off valve 24", such as an electrically and/or hydraulically controlled on/off valve, located between the second working chamber 16 and the second fluid line 26.

When a fluid communication between one of the working chambers 14, 16 and the second fluid line 26 is established, that working chamber assumes an atmospheric pressure state, i.e. a zero positive pressure state.

The control means of the digital pressurized medium assembly 10 can be controlled such that each one of the working chambers either assumes the zero positive pressure state (hereinafter denoted by 0) or the predetermined non-zero positive pressure P state (hereinafter denoted by 1). As such, the digital pressurized medium assembly 10 can assume the four load states that are presented in Table 1.

TABLE 1

Load states of the FIG. 2 digital pressurized medium assembly 10

| State # | first working chamber 14 | second working chamber 16 |
|---|---|---|
| $A_1$ | 0 | 1 |
| $A_2$ | 0 | 0 |
| $A_3$ | 1 | 1 |
| $A_4$ | 1 | 0 |

Since the second working chamber 16 is a retracting chamber, the A load state results in that the digital pressurized medium assembly 10 produces a negative load 1_i in the first direction X. The A2 load state results in a zero load 1_2 whereas the A3 and A4 load states results in positive loads L3, L4.

Figure 3:
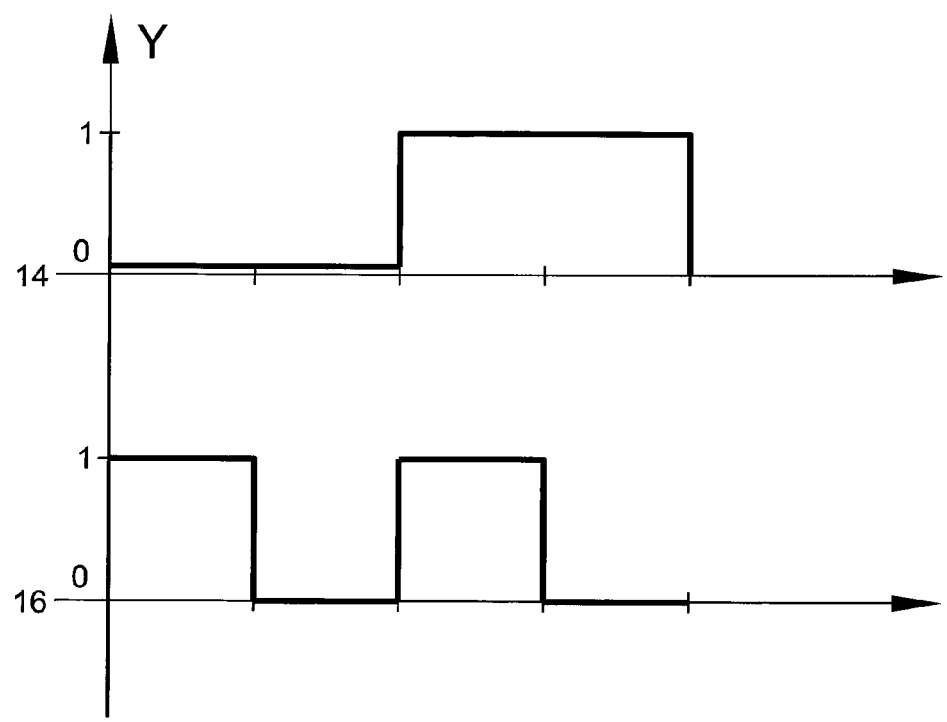
FIG. 3 illustrates load levels obtainable by the FIG. 2 assembly.
Figure 3:
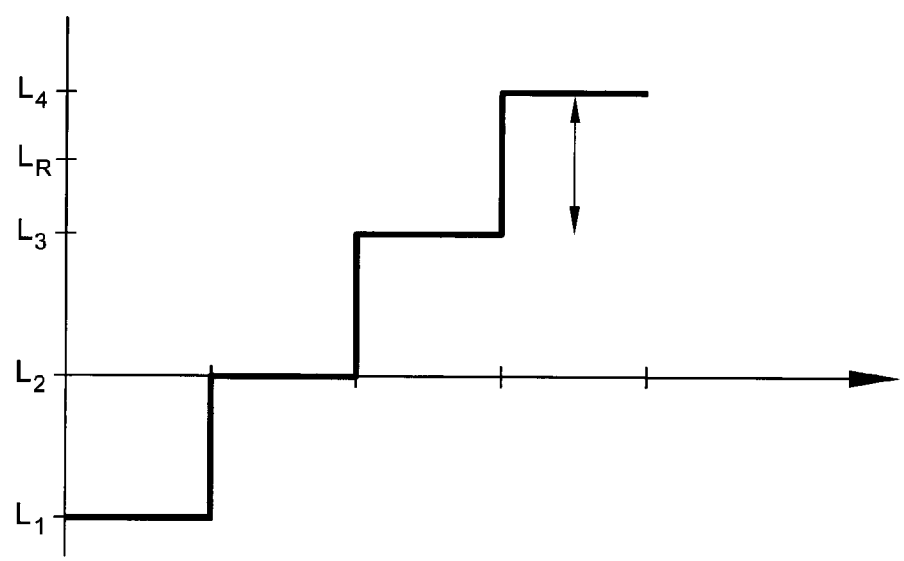

FIG. 3 illustrates the pressure state (0 or 1) for each one of the working chambers 14, 16 for each one of the load states Ai-A4. Moreover, the loads U, L2, L3, LA obtained from the four load states A!, A2, A3, A4 are illustrated in FIG. 3. As may be gleaned from FIG. 3, the digital pressurized medium assembly 10 is adapted to produce discrete load levels. As such, if a load LR is requested from the digital pressurized medium assembly 10 which requested load L is located between two of the discrete loads, e.g. L3 and L4 in the example illustrated in FIG. 3, that are possible to obtain from the digital pressurized medium assembly 10, there is a risk that the digital pressurized medium assembly 10 will oscillate between the two load states A3, A.

The invention will, in the following, be exemplified by embodiments. It is to be understood, however, that the embodiments are included in order to explain principles of the invention and not to limit the scope of the invention defined by the appended claims.

Figure 4:
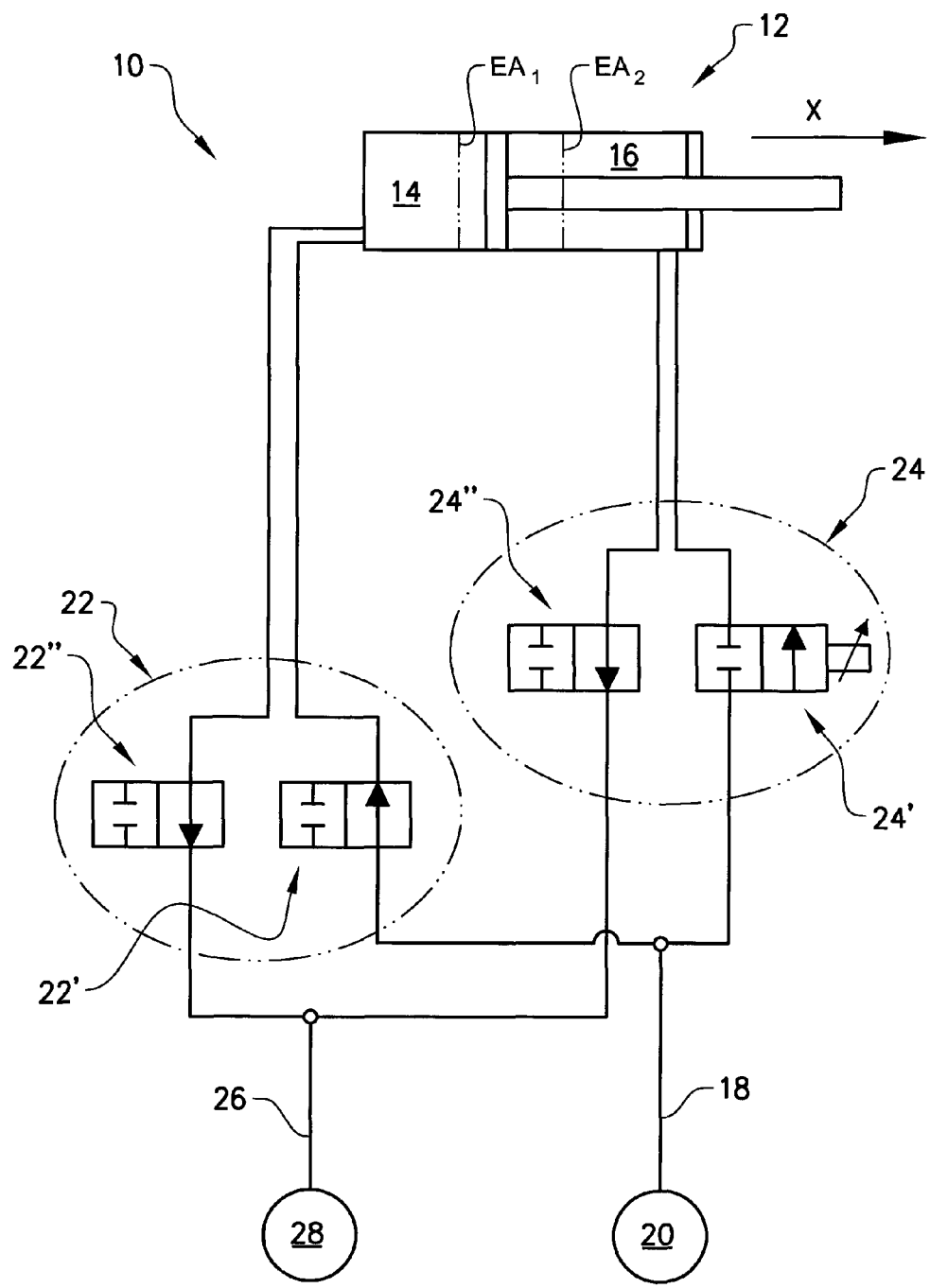
FIG. 4 illustrates a pressurized medium assembly according to an embodiment of the present invention.

FIG. 4 illustrates an embodiment of the present invention. As such, FIG. 4 illustrates a pressurized medium assembly 10 comprising a first working chamber 14 and a second working chamber 16. The first 14 and second 16 working chambers are adapted to together produce a load. The FIG. 4 assembly 10 comprises a double acting cylinder 12 which in turn comprises the first working chamber 14 and the second working chamber 16. In the implementation illustrated in FIG. 4, the first working chamber 14 is an extracting working chamber and the second working chamber 16 is a retracting chamber. Moreover, the digital pressurized medium assembly 10 is adapted to produce a load L in a first direction X. Preferably, the effective area of the first working chamber 14 is larger than the effective area EA2 of the second working chamber 16.

Moreover, the pressurized medium assembly 10 illustrated in FIG. 4 comprises a first fluid line 18 which is adapted to contain a fluid at a first pressure level P•. To this end, the first fluid line 18 may preferably be adapted to be in fluid communication with a first pressure source 20. The first pressure source is in the FIG. 4 implementation a pump 20. The first pressure source 20 is adapted to provide fluid at least the first pressure level to the first fluid line 18.

Purely by way of example, the fluid used in the first fluid line 18 may be a gas, such as air, or a liquid, such as oil.

Moreover, the pressurized medium assembly 10 comprises a first control means 22, or first controller, adapted to provide a fluid communication between the first working chamber 14 and the first fluid line 18 in an on/off manner. To this end, although purely by way of example, the first control means 22 may comprise a first shut-off valve 22', such as an electrically and/or hydraulically controlled on/off valve, located between the first working chamber 14 and the first fluid line 18. In a similar vein, the digital pressurized medium assembly 10 comprises a second control means 24, or a second controller, adapted to provide a fluid communication between the second working chamber 16 and the first fluid line 18. However, in contrast to the FIG. 2 pressurized medium assembly 10, the second control means 24 is adapted to proportionally regulate the pressure in the second working chamber 16. To this end, although purely by way of example, the second control means 24 may comprise a first proportionally regulating valve 24' located between the second working chamber 16 and the first fluid line 18.

FIG. 4 further illustrates that the pressurized medium assembly 10 comprises a second fluid line 26 which is adapted to contain a fluid at a second pressure level P2. The second pressure level P2 is different from the first pressure level Pi. Preferably, the second pressure level P2 is lower than the first pressure level P To this end, although purely by way of example, the second fluid line 26 may be in fluid communication with a second pressure source 28. The second pressure source 28 is adapted to provide fluid at least the second pressure P2 to the second fluid line 26. Instead of, or in addition to, being in fluid communication with a second pressure source 28, the second fluid line 26 may be in fluid communication with a tank (not shown in FIG. 4). In such an example, the second pressure level P2 in the second fluid line 26 is an atmospheric pressure state, i.e. a zero positive pressure state.

Preferably, the fluid used in the second fluid line 26 may be the same as the fluid used in the first fluid line.

Each one of the first 22 and second 24 control means are adapted to provide on/off fluid communication between each one of the first and second chambers 14, 16 and the second fluid line 26. To this end, the first control means 22 may comprise a second shut-off valve 22", such as an electrically and/or hydraulically controlled on/off valve, located between the first working chamber 14 and the second fluid line 26. Moreover, the second control means 24 may comprise a second shut-off valve 24", such as an electrically and/or hydraulically controlled on/off valve, located between the second working chamber 16 and the second fluid line 26.

The first control means 22 of the pressurized medium assembly 10 illustrated in FIG. 4 can be controlled such that the first working chamber 14 either assumes the second pressure level P2 of the second fluid line 26 or the first pressure level P of the first fluid line 18.

Moreover, the second control means 24 pressurized medium assembly 10 illustrated in FIG. 4 is adapted to proportionally increase the pressure in the second working chamber 16 from the second pressure level P2 of the second fluid line 26 to the first pressure level Pi of the first fluid line 18.

As such, the embodiment of the pressurized medium assembly 10 illustrated in FIG. 4 can assume the load states that are presented in Table 2.

TABLE 2

Load states of the FIG. 4 digital pressurized medium assembly 10

| State # | first working chamber 14 | second working chamber 16 |
|---|---|---|
| A$_1$ | P$_2$ | stepless increase from P$_2$ to P$_1$ |
| A$_2$ | P$_2$ | P$_2$ |
| A$_3$ | P$_1$ | stepless increase from P$_2$ to P$_1$ |
| A$_4$ | P$_1$ | P$_2$ |

Figure 5:
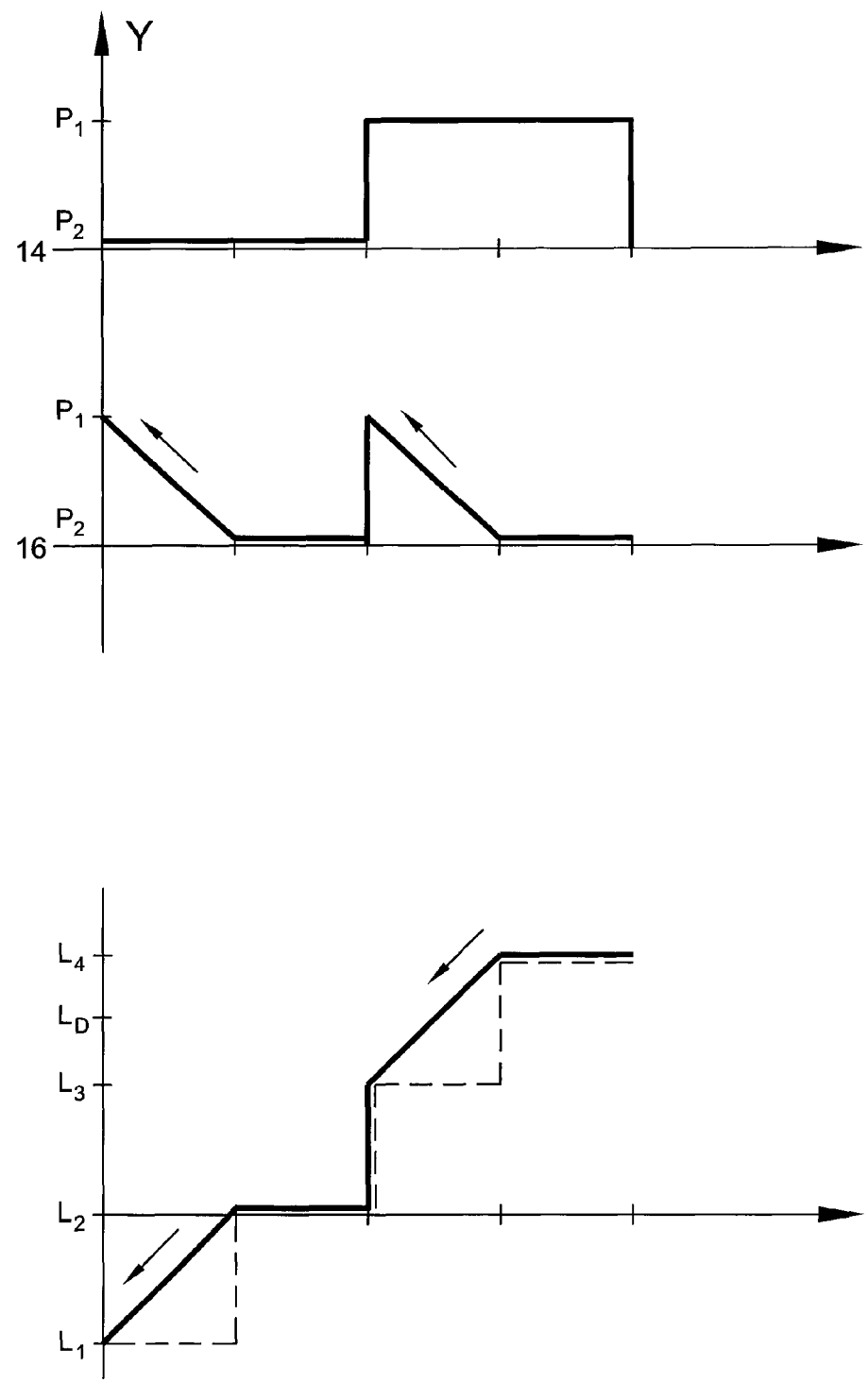
FIG. 5 illustrates load levels obtainable by the FIG. 4 assembly.

The pressure in each one of the working chambers 14, 16 for each one of the four load states A1, A2, A3, A4 of Table 2, as well as the loads L obtainable therefrom, are illustrated in FIG. 5. Moreover, the discrete loads obtainable from the load states of the FIG. 2 system are indicated by a dashed line in FIG. 5.

As may be gleaned from FIG. 5, by virtue of the fact that it is possible to obtain a stepless pressure increase, from the second pressure P2 of the second fluid line 26 to the first pressure of the first fluid line 18, in the second working chamber 16, it is possible to obtain a stepless load decrease from fourth load level L4 down to the third load level L3. Moreover, it is possible to obtain a stepless load decrease from the second load level L2 down to the first load level As such, by the embodiment of the pressurized medium assembly 10 as illustrated in FIG. 4, the risk of obtaining an oscillation between the two load states for a requested load LD is reduced as compared to the FIG. 2 system.

Another embodiment of the pressurized medium assembly 10 may be obtained by arranging the second control means 24 such that it is adapted to proportionally decrease the pressure in the second working chamber 16 from the first pressure level of the first fluid line 18 to the second pressure level P2 of the second fluid line 26. Moreover, the second control means 24 of the present embodiment may comprise a second shut-off valve 24", such as an electrically and/or hydraulically controlled on/off valve, located between the second working chamber 16 and the first fluid line 18. The present embodiment may be used for obtaining a stepless load increase, e.g. from the third load level 1_3 to the fourth load level L4.

Figure 6:
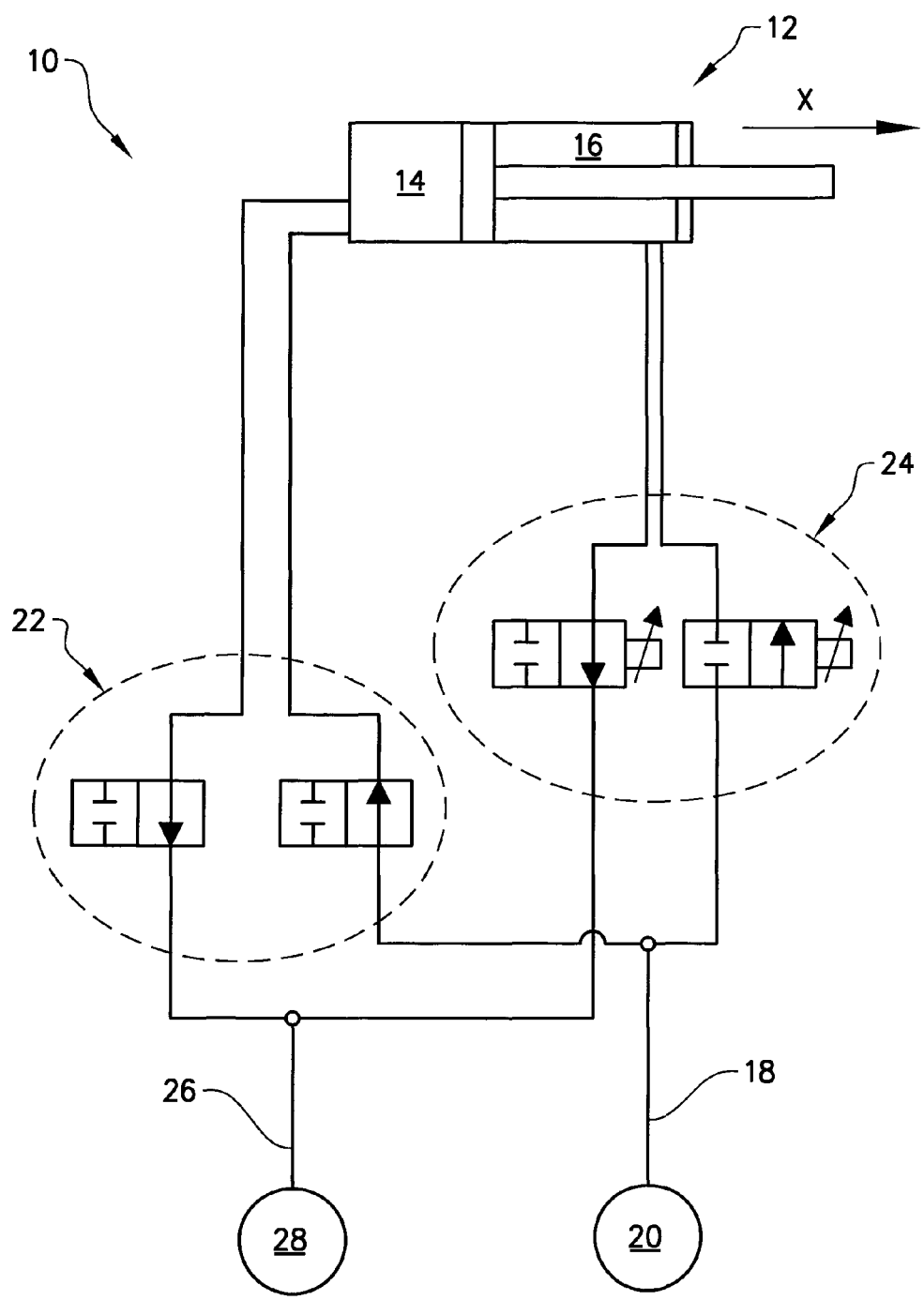
FIG. 6 illustrates a pressurized medium assembly according to another embodiment of the present invention.

FIG. 6 illustrates a further embodiment of the pressurized medium assembly 10. As compared to the FIG. 4 embodiment, the second control means 24 of the FIG. 6 embodiment is also adapted to proportionally, i.e. not in an on/off manner, control the fluid communication between the second working chamber 16 and the second fluid line 26.

As such, the embodiment of the pressurized medium assembly 10 illustrated in FIG. 6 can assume the load states that are presented in Table 3.

TABLE 3

Load states of the FIG. 6 digital pressurized medium assembly 10

| State # | first working chamber 14 | second working chamber 16 |
|---|---|---|
| A$_1$ | P$_2$ | stepless increase from P$_2$ to P$_1$ |
| A$_2$ | P$_2$ | stepless decrease from P$_1$ to P$_2$ |
| A$_3$ | P$_1$ | stepless increase from P$_2$ to P$_1$ |
| A$_4$ | P$_1$ | stepless decrease from P$_1$ to P$_2$ |

Figure 7:
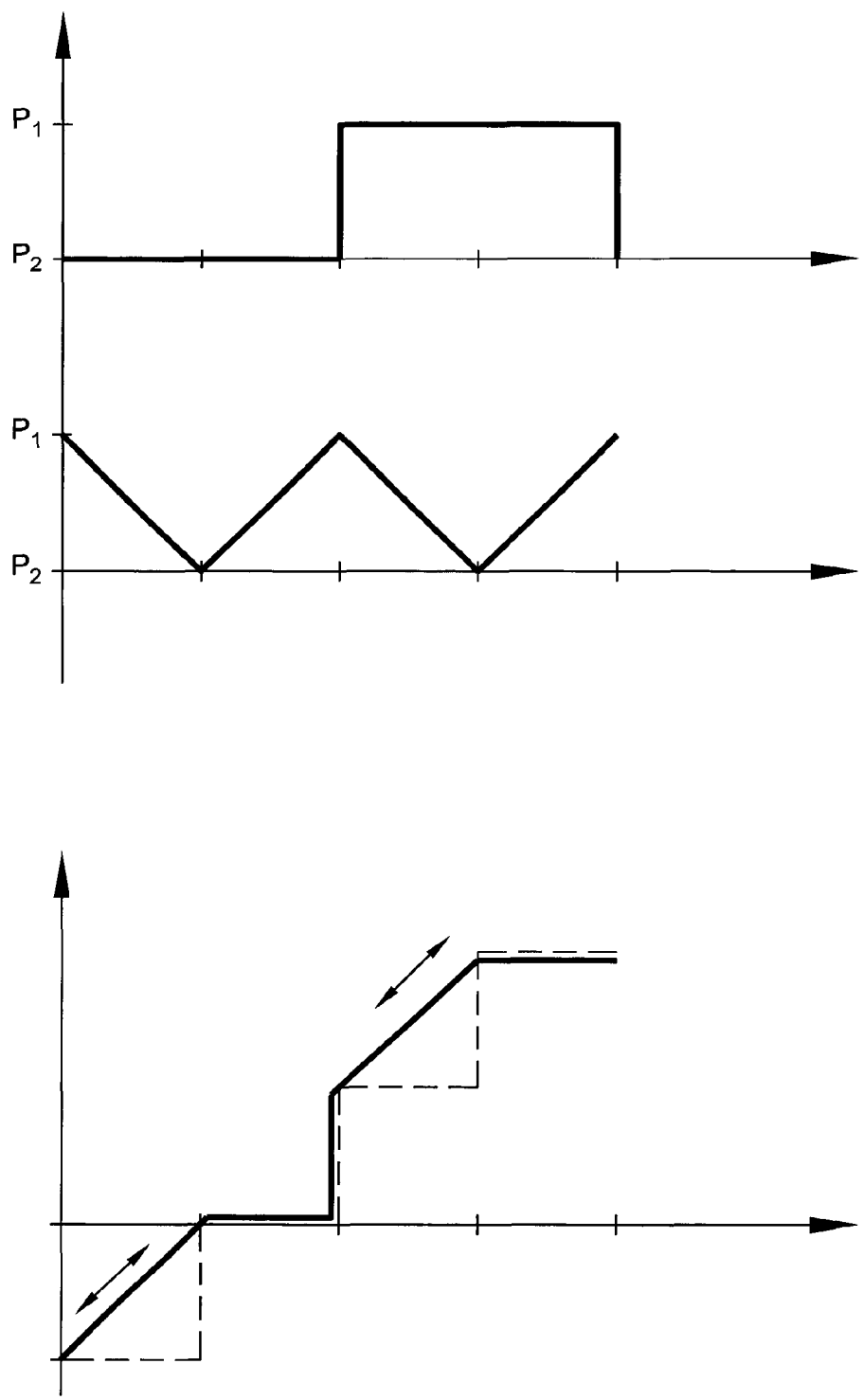
FIG. 7 illustrates load levels obtainable by the FIG. 6 assembly.

The pressure in each one of the working chambers 14, 16 for each one of the four load states A1, A2, A3, A4 of Table 3, as well as the loads L obtainable therefrom, are illustrated in FIG. 7. Moreover, the discrete loads obtainable from the load states of the FIG. 2 system are indicated by a dashed line in FIG. 7.

As may be gleaned from FIG. 7, the fact that the second control means 24 is adapted to proportionally control the fluid communication between the second working chamber 16 and the second fluid line 26 implies that it is possible to obtain a load range that at least comprises sub-ranges in which the load L may be steplessly increased as well as steplessly decreased.

Figure 8:
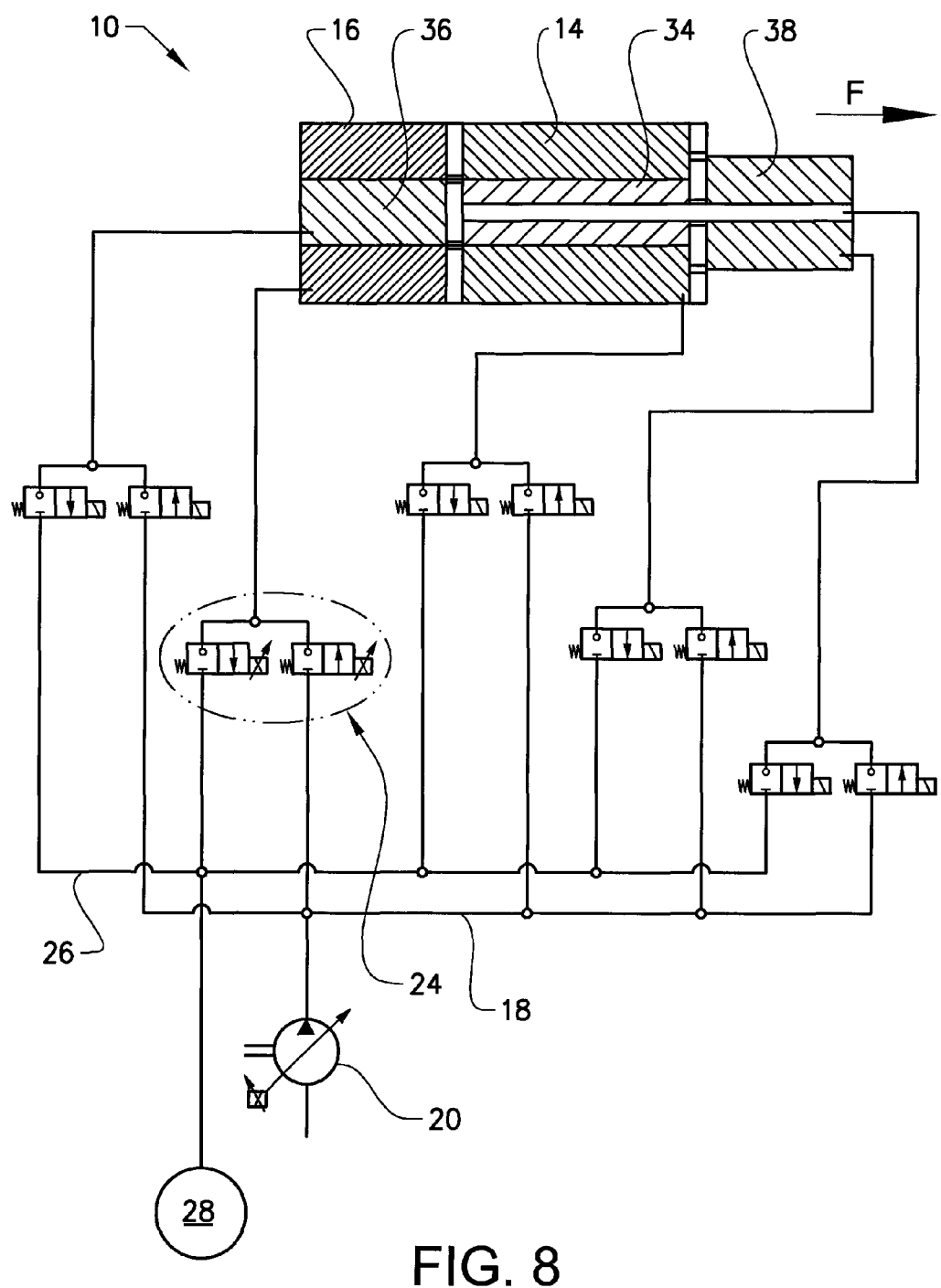
FIG. 8 illustrates a pressurized medium assembly according to an embodiment of the present invention.

FIG. 8 illustrates another embodiment of the pressurized medium assembly 10. The FIG. 8 assembly 10 comprises an actuator 12 which in turn comprises a first working chamber 14, a second working chamber 16, a third working chamber 34, a fourth working chamber 36 and a fifth working chamber 38. Moreover, the FIG. 8 embodiment comprises a first fluid line 18, a second fluid line 26 as well as a first 20 and second 28 pressure source (or a tank). Details of the fluid lines 18, 26 as well as the pressure sources 20, 28 have been presented when discussing the FIG. 4 and FIG. 6 embodiments of the present invention hereinabove and are consequently not repeated here.

FIG. 8 further illustrates that the each one of the first 14, the third 34, the fourth 36 and the fifth 38 working chambers are connectable to each one of the first and second fluid lines 18, 26 in an on/off manner.

Moreover, the FIG. 8 embodiment comprises a second control means 24 adapted to proportionally control the fluid communication between the second working chamber 16 and the first fluid line 18. Furthermore, the FIG. 8 implementation of the second control means 24 is adapted to proportionally control the fluid communication between the second working chamber 16 and the second fluid line 26.

The second working chamber 16 of the FIG. 8 pressurized medium assembly 10 has the largest effective area of each one of the five working chambers. This implies that steplessly variable load L may be obtained in a straightforward manner.

However, in order to reduce the amount of power losses that may occur due to the proportional regulation of the second working chamber 16, it may be preferred that the second working chamber 16 is not the largest one of the working chambers of the pressurized medium assembly 10. In other words, it may be preferred that the effective area of at least the first working chamber 14 is larger than the effective area of the second working chamber 16.

Figure 9:
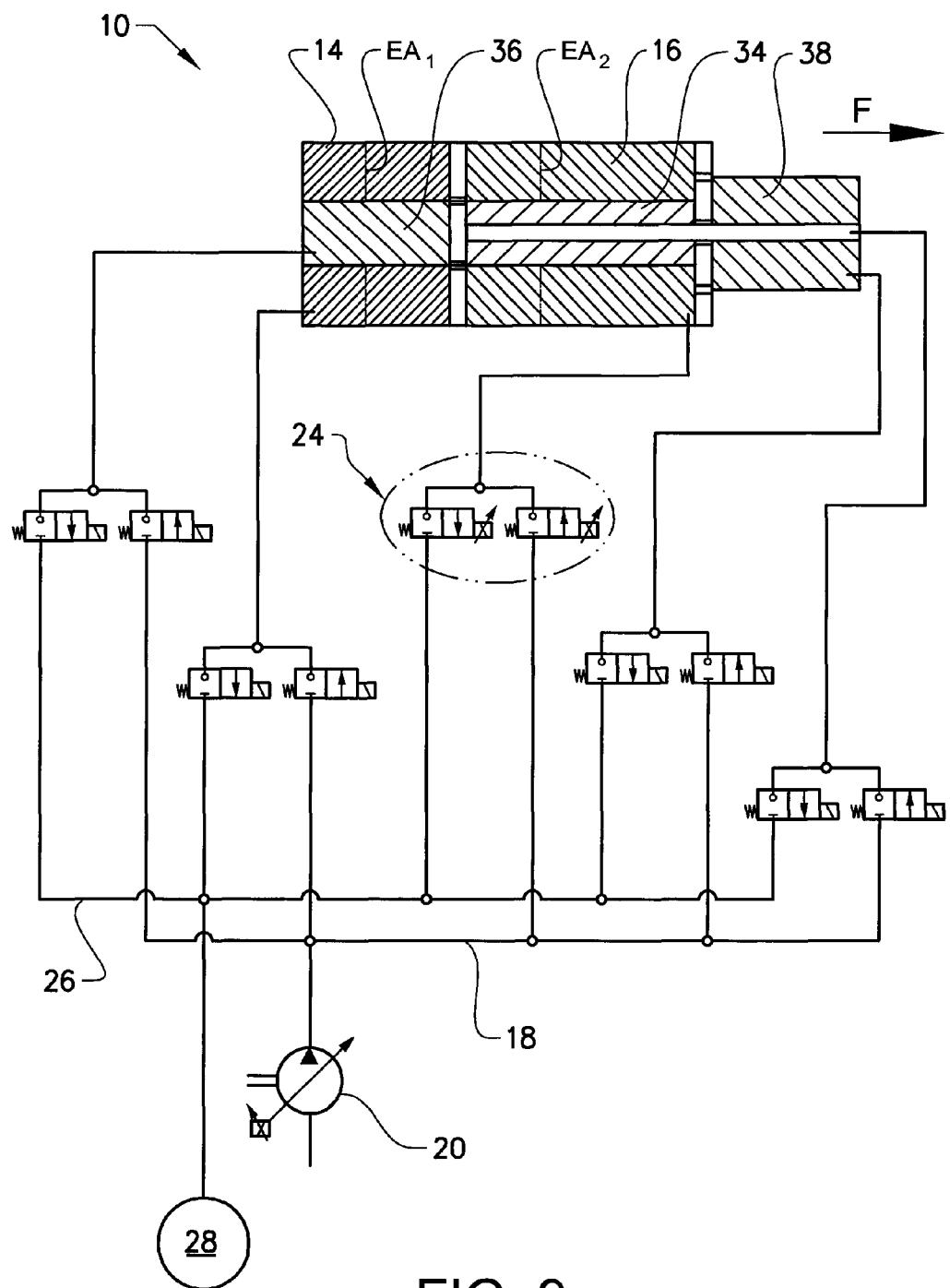
FIG. 9 illustrates a pressurized medium assembly according to another embodiment of the present invention.

An example of such an embodiment is illustrated in FIG. 9. As may be gleaned from FIG. 9, the second working chamber 16, which second chamber 16 is proportionally controlled as has been discussed hereinabove, has a second effective area EA2 which is smaller than the first effective area EA of the first chamber 14. In the FIG. 9 embodiment, the second chamber 16 is instead the largest retracting chamber of the FIG. 9 pressurized medium assembly 10.

Purely by way of example, the working chambers 14, 16, 34, 36, 38 of the FIG. 9 assembly 10 may have different effective areas. As a non-limiting example, the effective area of the first working chamber 14 may be at least approximately twice as large as the effective area of the second working chamber 16. Moreover, the effective area of the second working chamber 14 may be at least approximately twice as large as the effective area of the third working chamber 34. Furthermore, the effective area of the third working chamber 34 may be at least approximately twice as large as the effective area of the fourth working chamber 36. Additionally, the effective area of the fourth working chamber 36 may be at least approximately twice as large as the effective area of the fifth working chamber 38.

As such, according to the above non-limiting example, the working chambers 14, 16, 34, 36, 38 may have effective areas according to the following ratios: 1:2:4:8:16.

Moreover, a pressurized medium assembly could preferably comprise a third working chamber and the third control means adapted to proportionally regulate the pressure in the third working chamber.

Figure 10:
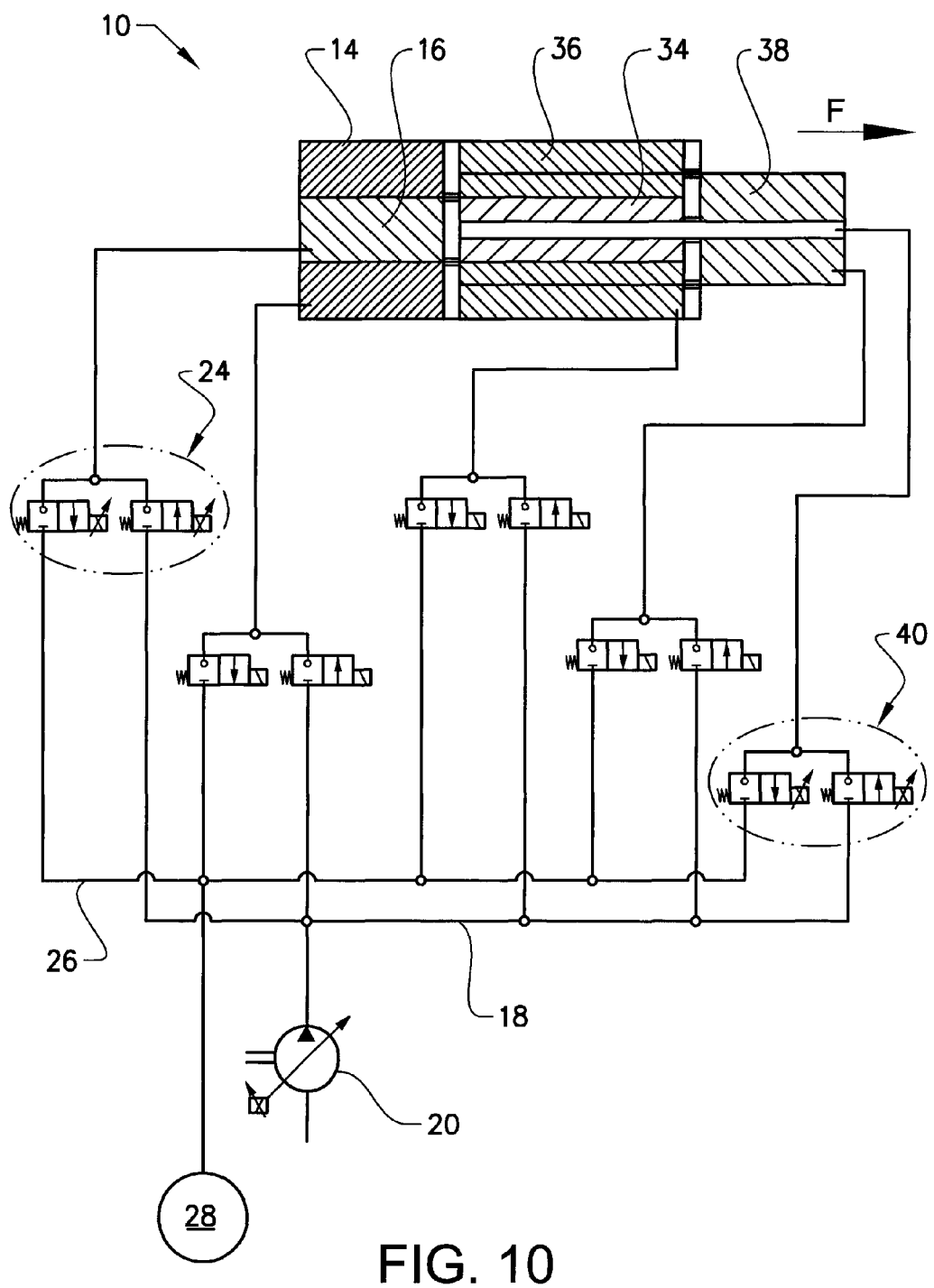
FIG. 10 illustrates a pressurized medium assembly according to a further embodiment of the present invention.

An example of an embodiment comprising two working chambers wherein the pressure in each one of the working chambers is proportionally regulated is illustrated in FIG. 10.

As such, FIG. 10 illustrates a pressurized medium assembly 10 comprising five working chambers. In the FIG. 10 embodiment, each one of the two smallest working chambers 16, 34 have control means, viz the second control means 24 and a third control means 40, adapted to proportionally regulate the pressure in the second working chamber 16 and the third working chamber 34, respectively.

In the above discussed embodiments of the pressurized medium assembly 10, the proportional control means have been exemplified as 2/2-way proportional valves.

Figure 11:
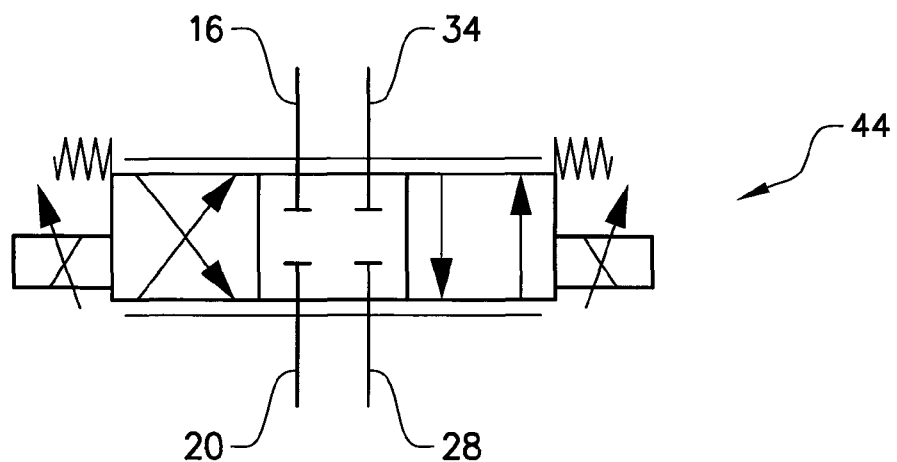
FIG. 11 illustrates an implementation of a proportional control means.
Figure 12:
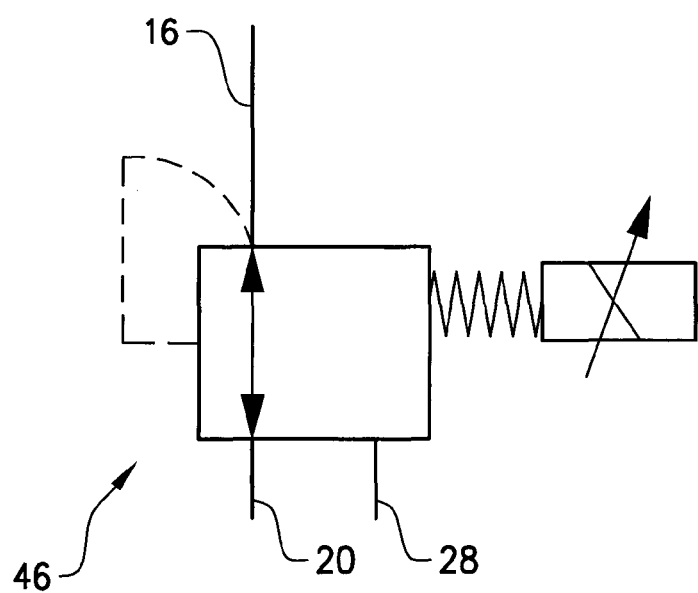
FIG. 12 illustrates another implementation of a proportional control means.

However, FIG. 11 and FIG. 12 illustrate alternative implementations of proportional control means. For instance, FIG. 11 illustrates a single spool valve 44 that is adapted to proportionally regulate the pressure in two chambers 14, 34.

Furthermore, FIG. 12 illustrates a proportional pressure control valve 46. One advantage of a proportional pressure control valve is that it implies a simplified control since the output of the valve is a controlled pressure. Moreover, a proportional pressure control valve may be controlled by one single actuator, e.g. solenoid, hydraulic signal or the like.

Figure 13:
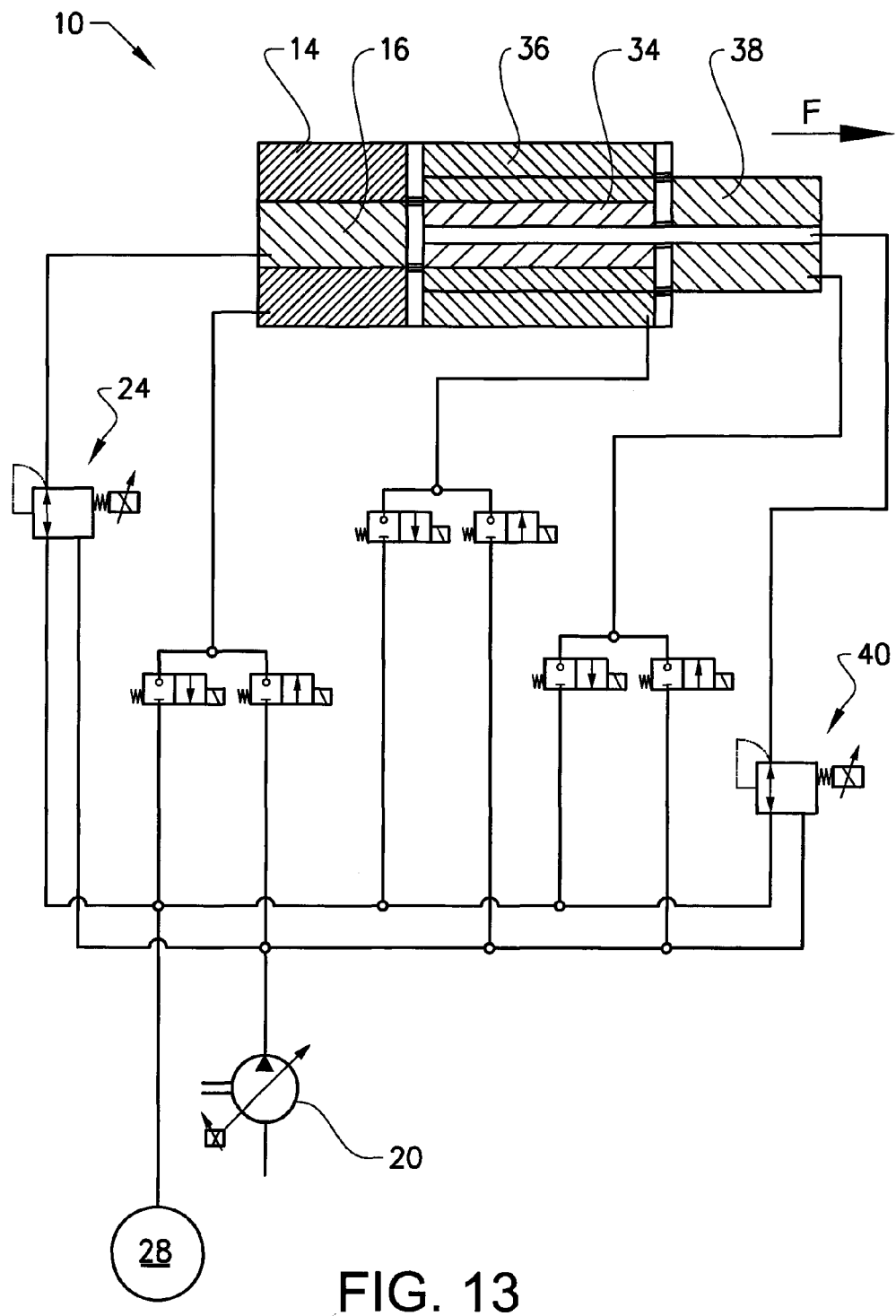
FIG. 13 illustrates a pressurized medium assembly according to another embodiment of the present invention.

FIG. 13 illustrates an embodiment of a pressurized medium assembly 10 which is similar to the FIG. 10 embodiment, with the exception that the FIG. 13 embodiment comprises proportional pressure control valves, viz the second control means 24 and the third control means 40.

Figure 14:
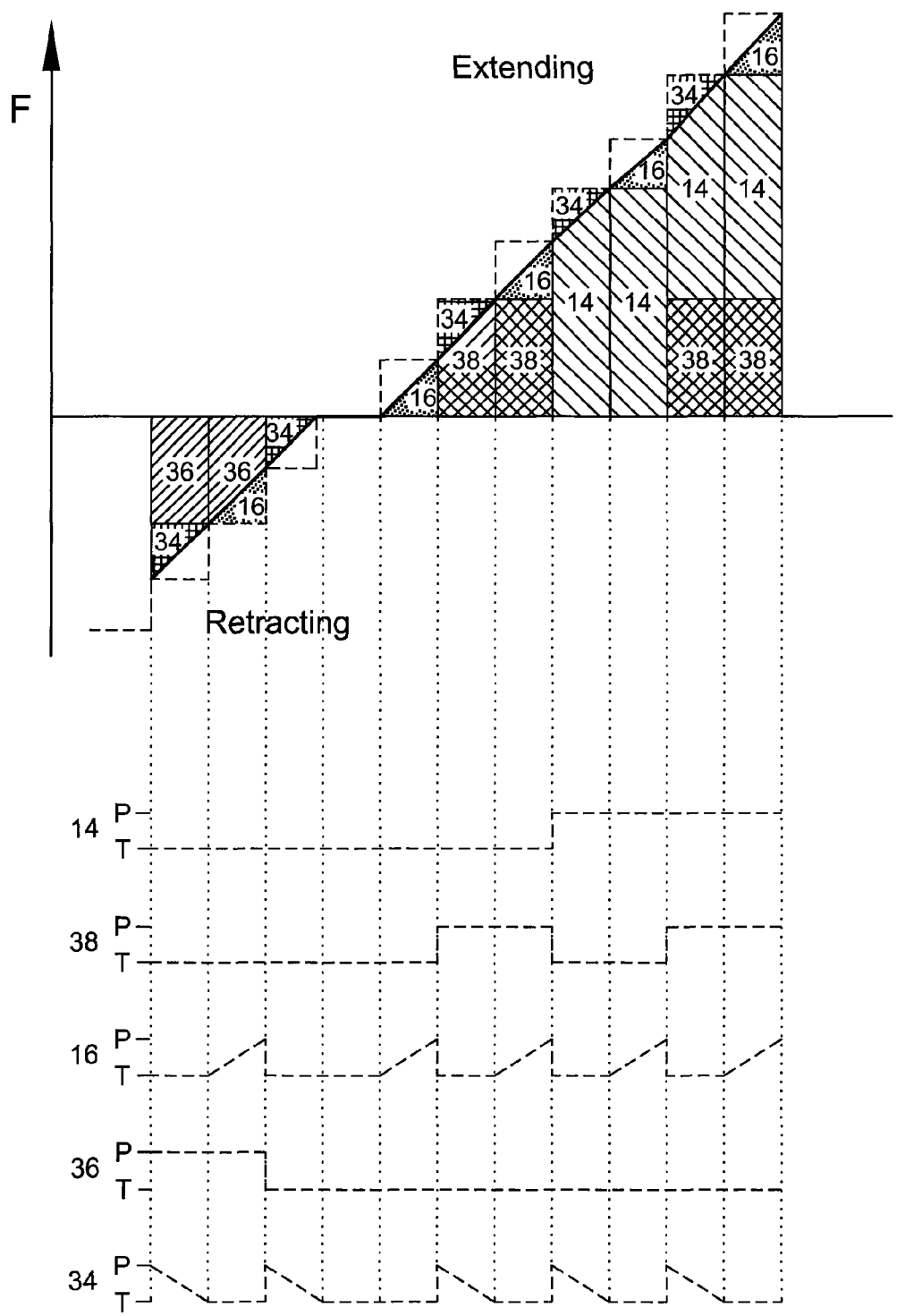
FIG. 14 illustrates a pressure control sequence of a pressurized medium assembly.

FIG. 14 illustrates a preferred method of controlling a pressurized medium assembly 10 which comprises a proportionally controlled extracting working chamber and a proportionally controlled retracting working chamber. The control method illustrated in FIG. 14 could for instance be used on the FIG. 10 and/or FIG. 13 embodiments that have been 5 discussed hereinabove.

As may be gleaned from FIG. 14, when going from the lowest load to the highest load that can be produced by the assembly 10 the preferred control method alternately proportionally controls the pressure in the extracting working chamber 16 and the retracting working chamber 34, respectively.

Preferably, one of the proportionally controlled working chambers is firstly controlled proportionally over its entire pressure range (i.e. between P-i and P2) before the other proportionally controlled working chambers is proportionally controlled, preferably also over its entire pressure range, before the first proportionally chamber is proportionally controlled again.

It should be noted that although the embodiments of the invention which have been described hereinabove comprises two fluid lines 18, 26, it is envisaged that embodiments of the pressurized medium assembly 10 may comprise more than two fluid lines.

Figure 15:
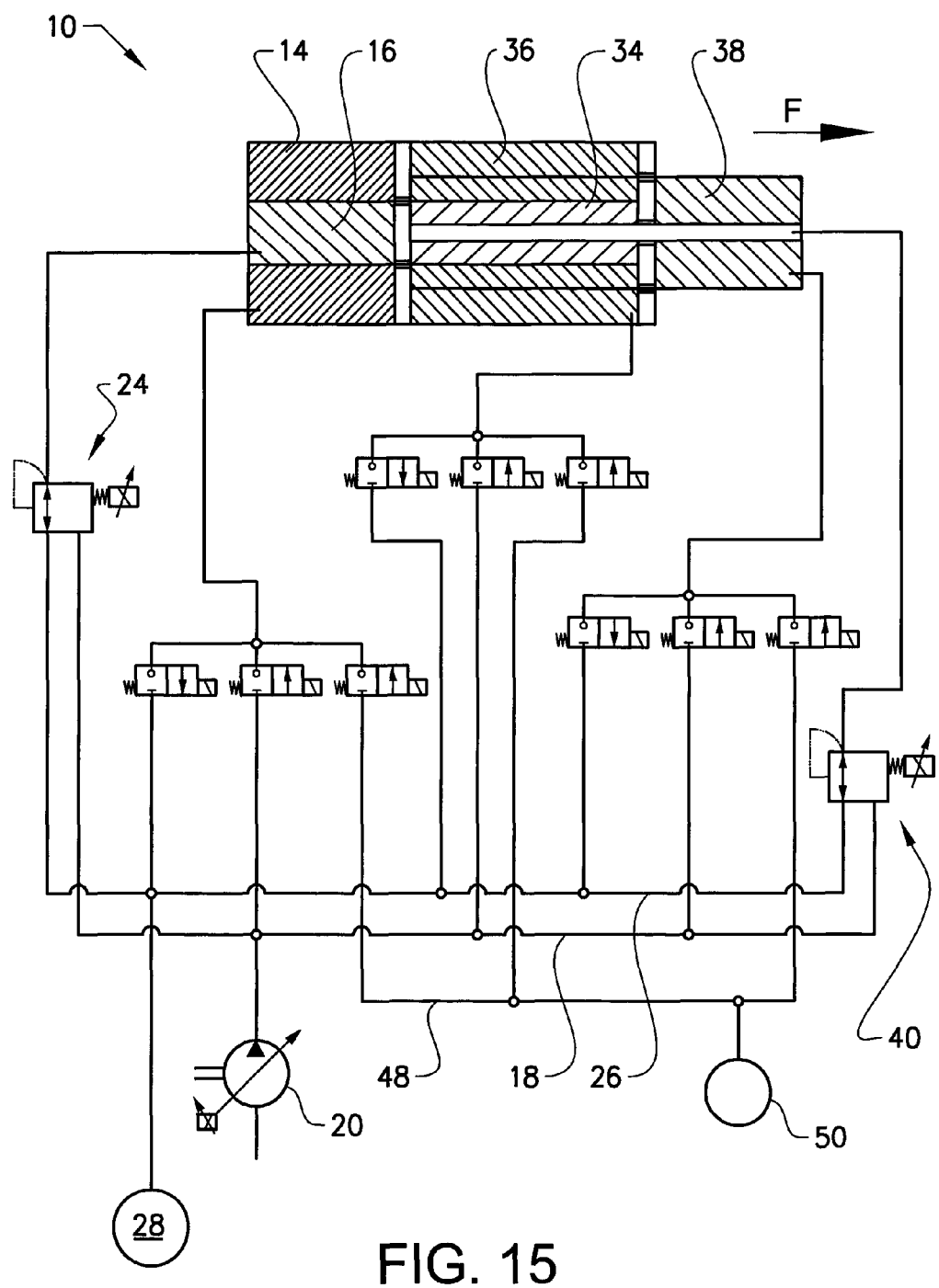
FIG. 15 illustrates a pressurized medium assembly according to a further embodiment of the present invention.

For instance, FIG. 15 illustrates an embodiment of the pressurized medium assembly 10 which comprises three fluid lines, viz a first fluid line 18, a second fluid line 26 and a third fluid line 48. The first fluid line 18 is adapted to be in fluid communication with a first pressure source 20, the second fluid line 26 is adapted to be in fluid communication with a second pressure source 28 and the third fluid line 48 is adapted to be in contact with a third pressure source 50. The first, second and third pressure sources 20, 28, 50 may preferably be adapted to provide separate pressure levels P^, P2, P3.

Moreover, in a similar vein as has been discussed hereinabove, the pressurized medium assembly 10 illustrated in FIG. 15 comprises control means for selectively providing a fluid communication between one of the first, second and third fluid lines 18, 26, 48 and at least one of the working chambers 14, 36, 38 in an on-off manner.

Furthermore, the FIG. 15 the pressurized medium assembly 10 comprises control means 24, 40 for proportionally regulating the pressure in at least one of the other working chambers 16, 34. As a non-limiting example, the proportionally regulating control means 24, 40 may be connected to only two of the first, second and third fluid lines 18, 26, 48. For instance, the proportionally regulating control means may be connected to the fluid line with the highest pressure and the fluid line with the lowest pressure.

Moreover, the above discussed embodiments of the pressurized medium assemblies 10 comprise an actuator which in turn comprises the working chambers. However, it should be noted that pressurized medium assemblies 10 could instead, or in addition, comprise at least two actuators 52, 54 each one of which comprising at least one, though preferably at least two, working chambers.

Figure 16:
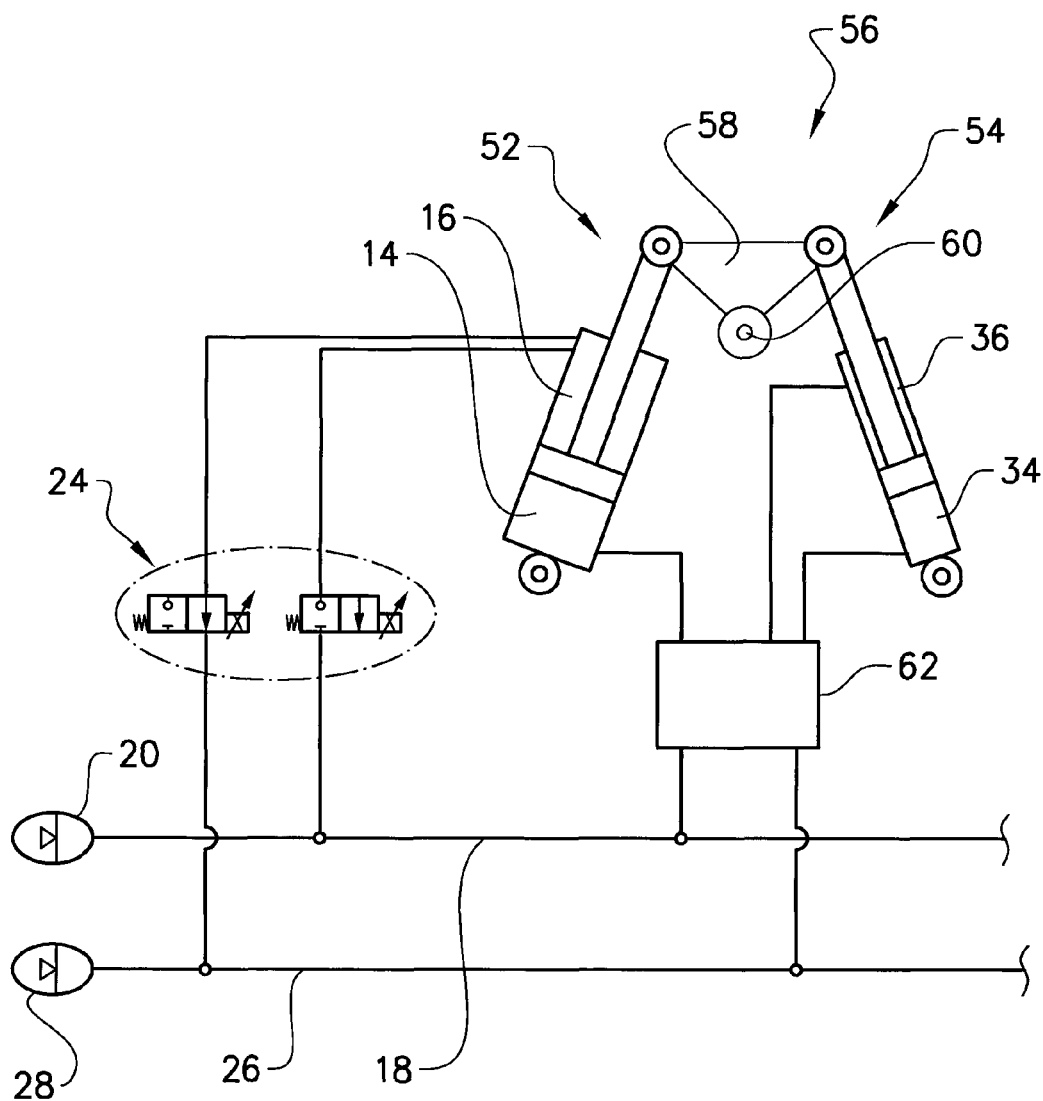
FIG. 16 illustrates a pressurized medium steering system.

For instance, FIG. 16 illustrates a pressurized medium steering system 56 for an articulated vehicle (not shown in FIG. 16). The medium steering system 56 comprises a first actuator 52, or cylinder, which in turn comprises a first 14 and a second 16 working chamber. Moreover, the medium steering system 56 comprises a second actuator 54, or cylinder, with a third 34 and a fourth 36 working chamber. The first actuator 52 and the second actuator 54 are preferably connected to one another, for instance via a connection member 58, in order to provide a resultant torque at a common point 60.

Purely by way of example, the working chambers 14, 16, 34, 36, 38 of the FIG. 8 pressurized medium steering system 56 may have different effective areas. As a non-limiting example, the effective area of the first working chamber 14 may be at least approximately twice as large as the effective area of the second working chamber 16. Moreover, the effective area of the second working chamber 16 may be at least approximately twice as large as the effective area of the third working chamber 34.

Furthermore, the effective area of the third working chamber 34 may be at least approximately twice as large as the effective area of the fourth working chamber 36. As such, according to the above non-limiting example, the working chambers 14, 16, 34, 36 may have effective areas according to the following ratios: 1:2:4:8.

Moreover, the pressurized medium steering system 56 comprises a first control assembly 62 for selectively providing a fluid communication between one a first and second fluid lines 18, 26 and at least one of the first, third and fourth working chambers 14, 36, 38 in an on-off manner. Furthermore, the FIG. 16 the pressurized medium steering system 56 comprises a second control means 24 for proportionally regulating the pressure in the second working chambers 16.

Finally, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A pressurized medium assembly comprising a first working chamber and a second working chamber, the first and second working chambers being adapted to together produce a load,
the pressurized medium assembly comprising a first control means being configured to provide a fluid communication between the first working chamber and a pressure line in an on/off manner such that the first working chamber can be pressurized to a finite number of pressure levels,
the pressurized medium assembly further comprising a second control means configured to provide a fluid communication between the second working chamber and a pressure line, wherein the second control means is configured to proportionally regulate the pressure in the second working chamber.

2. The pressurized medium assembly according to claim 1, wherein the effective area of the first working chamber is larger than the effective area of the second working chamber.

3. The pressurized medium assembly according to claim 1, wherein the second working chamber is a retracting chamber.

4. The pressurized medium assembly according to claim 1, wherein the second control means comprises a 2/2-way proportional valve.

5. The pressurized medium assembly according to claim 1, wherein the second control means comprises a proportional pressure control valve.

6. The pressurized medium assembly according to claim 1, wherein the pressurized medium assembly comprises, in addition to the first working chamber, at least one more working chamber adapted to be in fluid communication with a pressure line in an on/off manner.

7. The pressurized medium assembly according to claim 1, wherein the pressurized medium assembly comprises an actuator comprising at least two of the working chambers.

8. The pressurized medium assembly according to claim 1, wherein the pressurized medium assembly further comprises a third working chamber, the pressurized medium assembly further comprising a third control means configured to provide a fluid communication between the third working chamber and a pressure line, the third control means being configured to proportionally regulate the pressure in the third working chamber.

9. The pressurized medium assembly according to claim 8, wherein the pressurized medium assembly comprises a single spool valve configured to form a part of the second control means as well as the third control means.

10. A pressurized medium steering system for an articulated vehicle, the pressurized medium steering system comprising a pressurized medium assembly according to claim 1.

11. A vehicle comprising at least one of a pressurized medium assembly according to claim 1 and a pressurized medium steering system comprising a pressurized medium assembly according to claim 1.

12. A method for controlling a pressurized medium assembly comprising a first working chamber and a second working chamber in order to produce a load, the method comprising:
controlling a fluid communication between the first working chamber and a pressure line in an on/off manner such that the first working chambers is pressurized to a finite number of pressure levels;
providing a fluid communication between the second working chamber and a pressure line; and
proportionally regulating the pressure in the second working chamber.

13. The method according to claim 12, wherein the pressurized medium assembly further comprises a third working chamber, the method further comprising,
providing a fluid communication between the third working chamber and a pressure line, and
proportionally regulating the pressure in the third working chamber.

14. The method according to claim 13, wherein the second working chamber is a extending chamber and the third chamber is a retracting chamber, the method further comprising:
alternating between proportionally regulating the second chamber and proportionally regulating the third chamber.

* * * * *